United States Patent Office 2,714,544
Patented Aug. 2, 1955

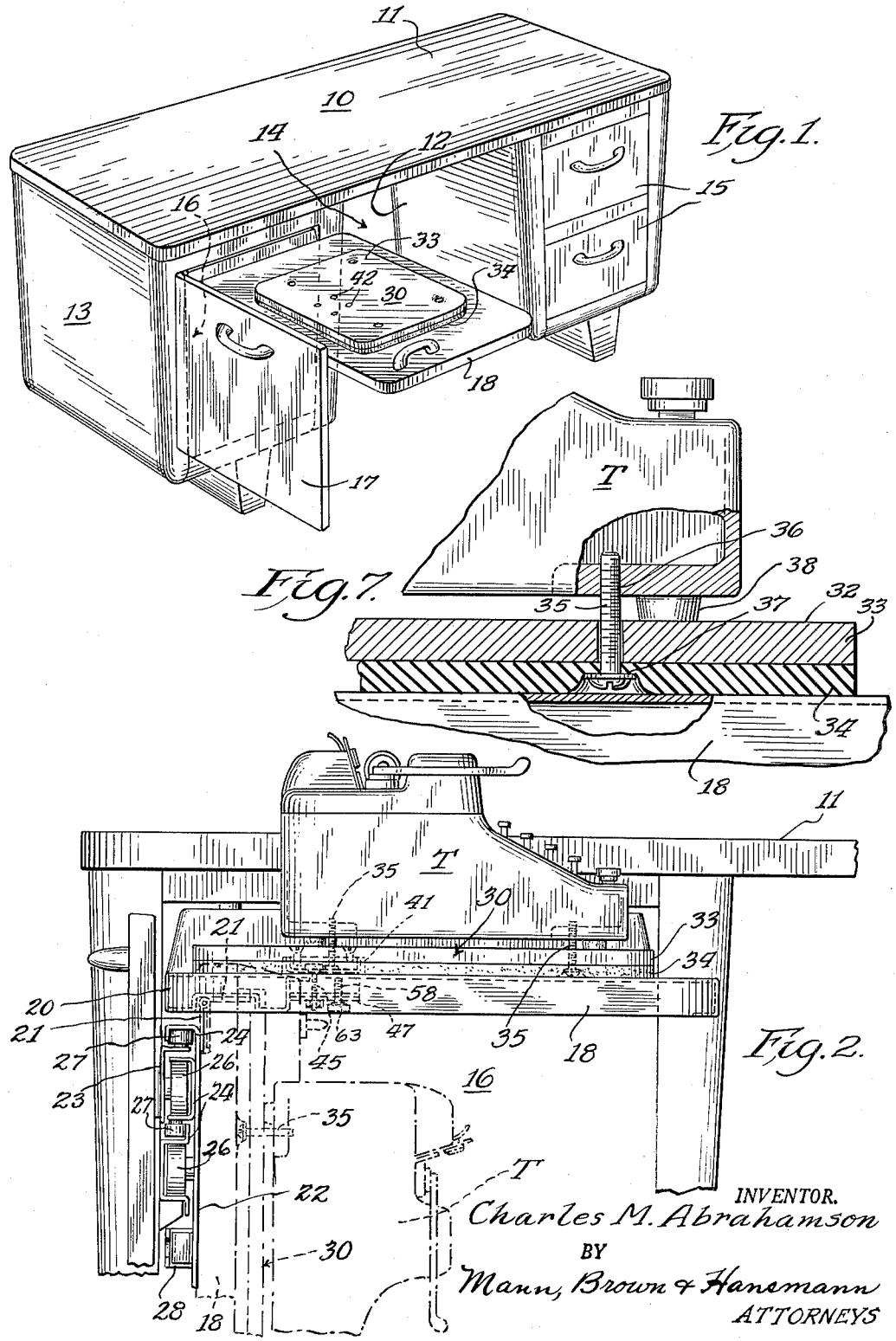

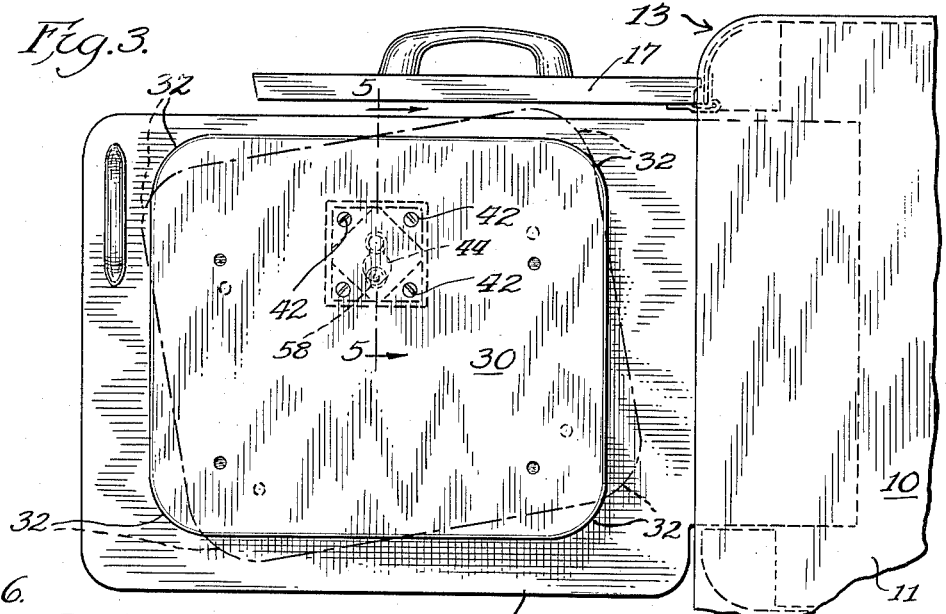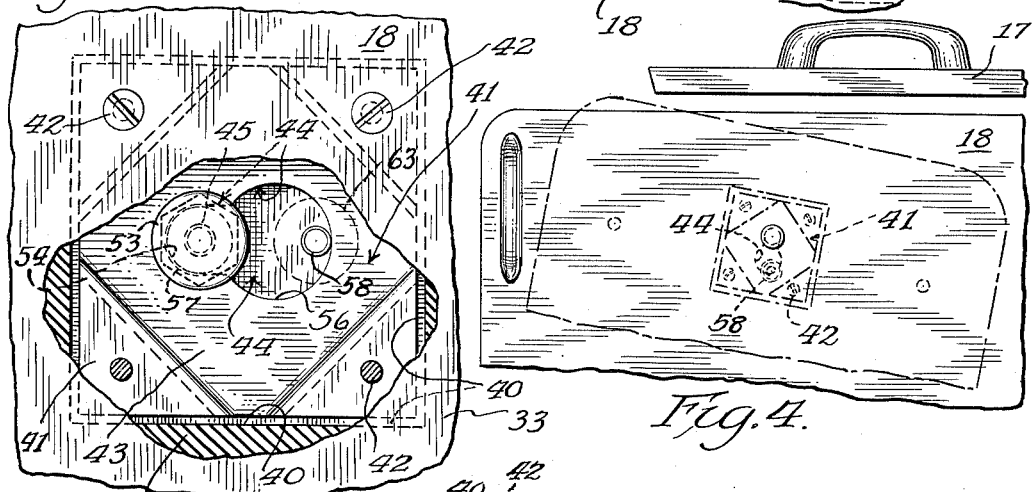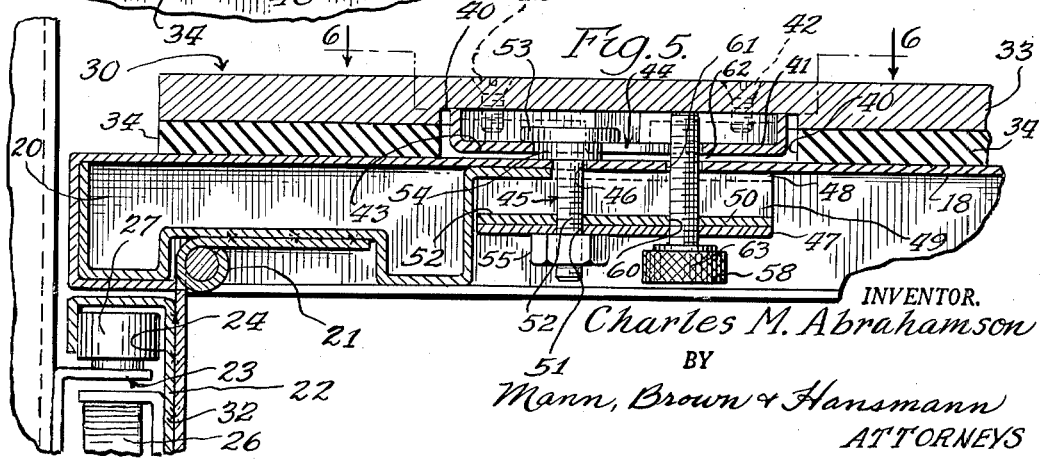

2,714,544

TYPEWRITER MOUNTING FOR DESKS

Charles M. Abrahamson, Aurora, Ill., assignor to All-Steel Equipment Inc., a corporation of Illinois Application November 29, 1951, Serial No. 258,957

15 Claims. (Cl. 312—29)

The improved typewriter mounting device comprising the present invention is primarily designed for use in connection with office typewriter desks of the type known as pedestal desks in which the typewriter, when not in use, may be concealed in a pedestal at one end of the desk. Such desks are usually provided with a second pedestal at the other end thereof adapted to contain stationary supplies and the space between the pedestals provides knee room for the typist when the typewriter is not in use.

The invention is, however, capable of other applications, and the present mounting device may be employed, with or without modification, in connection with other types of desks, cabinets, stands, tables or other supports, but it will find especially useful application with structures where the typewriter-supporting shelf or platform assumes a horizontal position when the machine is in use and assumes a vertical out-of-the-way position when the machine is not in use.

The improved mounting device is not necessarily limited to use in connection with the mounting of typewriters and the same may be employed for mounting other office machines such as adding or other calculating machines, duplicating machines, check writers and the like. Irrespective, however, of the particular use to which the invention may be put, the essential features thereof are at all times preserved.

It is among the principal objects of the invention to provide a typewriter mounting for desks or other supports including a typewriter base plate which may be more or less permanently secured to the typewriter, together with novel means whereby the plate may be readily attached to and detached from the supporting shelf or platform of the desk in order that the typewriter and base plate may be transferred from the desk to another similar desk incorporating the improved mounting means, or from the desk to any suitable supporting surface such as a conventional table or the like where the service of the typist may be required.

In carrying out the above mentioned object, the invention contemplates the provision of a supporting plate having associated therewith, as an inherent part thereof, a shock absorbing pad, and the nature of the connection between the typewriter and the plate and of detachable connection between the supporting plate as a whole and the supporting shelf of the desk are such that whether the typewriter and plate assembly is installed upon the desk shelf or is temporarily positioned upon an auxiliary support such as a table, the shock absorbing pad will perform its intended shock absorbing function without interference by any part of the connecting mechanism, and will protect the surface upon which it is placed from damage due to scratching.

An equally important object of the invention is to provide a typewriter mounting of the character briefly outlined above in which the typewriter base plate, when installed on the desk shelf or platform, is possessed of a limited degree of angular turning movement about a vertical axis so that the posture characteristics or the preferences of the individual typist may readily be accommodated.

A similar and related object is to provide such a mounting wherein the detachable connection between the typewriter base plate and the desk supporting shelf or platform will remain in a coupled condition throughout all increments of turning movement of which the typewriter with its base is capable.

Yet another and important object is to provide a typewriter mounting of this character in which the detachable connection between the desk shelf or platform and the typewriter base plate, in addition to performing its coupling function, additionally constitutes a suspension means for the typewriter when the desk shelf or platform is moved to its vertical out-of-the-way position.

With these and other objects in view, which will become more readily apparent as the disclosure proceeds, reference is made to the accompanying two sheets of drawings wherein a preferred embodiment of the invention has been illustrated.

In these drawings:

Figure 1 is a perspective view of a pedestal type office desk having a typewriter compartment and showing the typewriter supporting drop shelf thereof extended to its position of use and showing the improved typewriter mounting applied thereto;

Fig. 2 is an enlarged fragmentary front elevational view of the typewriter pedestal portion of the desk showing the desk drop shelf extended to its position of use with a typewriter mounted thereon;

Fig. 3 is a fragmentary plan view of the typewriter pedestal portion of the desk showing the typewriter supporting drop shelf extended to its position of use and showing the improved typewriter mounting of the present invention applied thereto;

Fig. 4 is a fragmentary plan view similar to Fig. 3 showing the typewriter base plate of the present invention moved to a different angular position;

Fig. 5 is an enlarged sectional view taken substantially along the line 5—5 of Fig. 3. In this view the hinged typewriter compartment door has been removed to more clearly illustrate the nature of the invention;

Fig. 6 is a fragmentary bottom plan view of a portion of the desk shelf in the vicinity of a detachable coupling mechanism employed in connection with the present invention; and Fig. 7 is a fragmentary sectional view showing the attachment between the mounting platform and the typewriter or other machine that it supports.

In all of the above described views, similar reference characters are employed to designate similar parts throughout.

Referring now to the drawings in detail and in particular to Fig. 1, the typewriter mounting of the present invention is, for illustrative purposes, shown as being applied to a pedestal desk 10 having a desk top 11 which is supported by end pedestals 12 and 13 which are spaced apart to provide a space 14 therebetween affording knee room for the typist. The pedestal 12 is adapted to contain a bank of drawers 15. The pedestal 13 encloses a typewriter compartment 16 within which the desk typewriter T (Fig. 2) is adapted to be stored in an out-of-the-way position when not in use. The compartment is adapted to be closed by means of a hinged door 17 when the typewriter is in its stored position.

The typewriter T is adapted to be detachably mounted upon and carried by a retractable shelf or support 18 associated with the pedestal 13 and the present invention is directed, in the main, to the specific detachable mounting means for the typewriter and which will be fully described subsequently.

In the form of pedestal desk illustrated, the desk shelf or support 18 is of the drop leaf or drop shelf type, which is to say, it assumes a horizontal elevated position in front of the pedestal 13 and at one side of the desk when extended for use, and it assumes a vertical lowered position within the compartment 16 when retracted.

The particular means whereby the desk drop shelf 18 may be supported from the pedestal 13 and shifted from its operative to its inoperative position and vice versa forms no part of the present invention and numerous drop shelf constructions have been devised, any one of which is suitable for application thereto of the typewriter mounting of the present invention. The specific drop leaf construction illustrated herein is of the type shown and described in my application, Serial No. 258,958, filed concurrently herewith, for Typewriter Desk, and reference may be had thereto for a full understanding thereof. In the present instance, only such portions of the drop shelf construction as are essential to the understanding of the typewriter mounting of the present invention have been disclosed.

Accordingly, the desk shelf 18 is pivotally connected along its rear edge 20 by means of hinges 21 to the upper edge of a slide rail 22 in the form of a vertically disposed sheet metal member or plate which is movable into and out of the compartment 16 on guide rails in a manner that will be briefly described presently.

Reference to the "rear" edge of the desk shelf 18 and subsequent references to other portions thereof are absolute with respect to the shelf per se in relation to the normal position of the typewriter T when mounted thereon, while reference to portions of the desk structure other than the desk shelf are absolute with respect to the desk considered as a whole. Thus, the rear edge 20 of the desk shelf is actually the left hand side edge of the shelf as viewed relative to the desk in Figs. 1 and 2.

Only a portion of the supporting means for the slide rail 22 has been illustrated herein. This supporting means includes a stationary supporting guide channel assembly 23 suitably secured to the side wall 25 of the pedestal 13, and a movable guide channel or rail 24 secured to the slide rail 22 respectively. The channel 23 extends horizontally rearwardly from the front of the compartment 16 toward the rear thereof on the inside of the pedestal. These channels or rails cooperate with supporting rollers 26 and thrust rollers 27 for guiding the slide rail in its horizontal movements into and out of the compartment 16.

In Fig. 2, the desk drop shelf 18 is shown in full lines in its operative horizontal extended position of use with the typewriter T mounted thereon. The dotted line position of the shelf and typewriter represents the positions they assume when the drop shelf 18, with the machine mounted thereon, has been swung downwardly about the axis of the hinges 21 to its lowered position with the slide rail 22 still extended and prior to rearward movement thereof to its enclosed out-of-the-way position.

It will be understood that means are provided, but not shown herein, for supporting the desk drop shelf 18 in its horizontal extended position, for locking the same in such position, and for reinforcing the slide rail 32 when in its extended position. A portion of this latter means in the form of a bifurcated tongue 28 carried by the slide rail 32 and designed for cooperation with a lug (not shown) on the inside of the hinged door 17 is illustrated. For a full understanding of this and other mechanism associated with the drop shelf desk construction, reference may be had to my above mentioned copending application.

Referring now to Figs. 1, 2 and 7, the improved mounting whereby the typewriter T may be detachably secured to the desk shelf 18 includes a composite typewriter base plate assembly 30 which is preferably of generally rectangular configuration having rounded corners 32. The base plate assembly 30 includes an upper base plate proper 33 which may be formed of a suitable material such as wood, a molded plastic composition, or a laminated pressed structure and having substantial rigidity. A lower shock absorbing pad 34, which may be of a soft resilient material such as foam rubber or other rubber composition, is substantially coextensive with the underneath surface of the base plate 33 and may be secured thereto by a suitable adhesive. The base plate 33 and its attached pad 34 are designed for attachment to the underneath side of a typewriter such as the machine T by means of suitable anchoring screws 35 which pass through the plate and pad through holes drilled to suit the particular typewriter being used, and are threadedly received in the usual threaded openings 36 provided in the frame of the machine for attachment purposes. Washers 37 are preferably associated with the screws 35 for preventing rupture of the pad 34 during installation of the assembly 30 on the machine T. The screws 35 may be received in the threaded openings 36 to such an extent that the material of the pad 34 is compressed in the vicinity of the washers 37 to give the effect of screws having heads which are countersunk in the material of the pad 34. In this manner the heads of the screws lie well within the confines of the pad and present no obstruction to proper seating of the pad on the desk shelf 18 or other support upon which the base assembly 30 may be placed. The usual rubber typewriter feet 38 serve to space the frame of the mounted typewriter from the upper face of the base plate proper 33.

Referring now additionally to Figs. 3 to 6 inclusive, the pad 34 is formed with a cutout portion providing a rectangular aperture or clearance opening 40 in which there is disposed an attachment plate 41 which is generally of rectangular configuration and which is secured by means of attachment screws 42 to the underneath face of the base plate 33. The attachment plate 41 is formed with a medial raised portion 43 having a keyhole slot 44 formed substantially centrally thereof. The keyhole slot 44 is designed for cooperation with a locating and suspension post 45 carried by the desk drop shelf 18 and the nature and function of which will be made clear presently.

The suspension post 45 projects through an opening 46 formed in the drop shelf 18 at a region substantially centered between the two sides of the shelf and somewhat rearwardly of the center thereof. The suspension post 45 is carried in a shallow U-shape bracket 47 (Figs. 2 and 5) having attachment flanges 48 by means of which the bracket is secured to the underneath surface of the drop shelf 18 and having a body portion 49 which is U-shape in cross section. A reinforcing plate 50 is disposed within the U-shape base portion 49 and may be secured thereto as by welding. The composite body portion and plate 49, 50 is formed with a threaded opening 51 therethrough which receives therein the threaded shank 52 of the attachment post 45. The shank 52 has formed thereon an enlarged head 53 and spacing neck 54, and a lock nut 55 is threadedly received on the end of the shank 52 to firmly anchor the attachment post in position with the neck 54 thereof bearing against the upper surface of the drop shelf 18 and with the head 53 spaced above the horizontal level of the upper surface of the drop shelf.

The attachment plate 41 is secured to the underneath face of the base plate 33 at a region slightly above the horizontal axis passing through the center of gravity of the assembled typewriter T and base plate 30 when the typewriter assumes the vertical dotted line position illustrated in Fig. 2 with the drop shelf 18 in its out-of-the-way position. The keyhole slot 44 (Fig. 6) includes a receiving and release opening 56 and a confining neck portion 57 which, when the base support assembly 18 is horizontal, extends toward the rear thereof so that when the drop shelf 18 is moved to its vertical out-of-the-way position the neck portion 54 of the attachment stud 45 will assume a horizontal position and serve as a pendulous support for the composite typewriter and base support, with the major portion of the weight of the assembly being borne by the neck portion 54 of the attachment stud which bears against the rounded end of the confining neck 57 of the keyhole slot 44. In order to releasably couple the attachment bracket 41 to the attachment stud 45, while at the same time permitting a limited degree of angular turning movement of the typewriter and its base support upon the surface of the drop shelf 18 when the latter is horizontal for adjustment purposes, a retaining screw 58 is threadedly received in an opening 60 extending through the base 47 and plate 52 and projects upwardly through an opening 61 formed in the drop shelf 18. The retaining screw is capable of being threaded through the opening 60 to such an extent that its upper end projects into the receiving and release opening 56 of the keyhole slot adjacent the curved inner edge thereof as shown in Fig. 6.

The retaining screw 58 is spaced from the locking and suspension post 45 a distance which is such that when the post is wholly contained within the confining neck 57 of the keyhole slot 44, a slight clearance, designated at 62, exists between the side of the retaining screw 58 and the wall of the opening so that the attachment plate 41 may not physically be shifted to a position wherein the locking and suspension post 45 is in register with the receiving and release opening 56 of the keyhole slot for removal purposes. The attachment plate 41 and attachment post 45 are thus coupled and locked together but at the same time a limited amount of angular turning movement of the typewriter and its support on the surface of the drop shelf 18 is made possible to accommodate the posture or preference of the typist. For example, the typewriter and its support may be centered on the drop leaf 18 as shown in full lines in Fig. 3 or it may be shifted to the extreme angularly offset position indicated in dotted lines in this figure. Alternatively, it may be angularly shifted in the other direction about the axis of the locking post 45 to the dotted line position indicated in Fig. 4.

The retaining screw 58 is provided with a knurled head 63 by means of which the same may be manipulated to retract the extreme end of the screw from the receiving and release opening 56 to a position below the horizontal level of the offset raised portion 43 and, when such a retraction has been effected, the entire typewriter and its supporting assembly, including the attachment plate 41, may be shifted slightly in a rearward direction to bring the locking and suspension post 45 into register with the receiving and release opening 56 of the bayonet slot 44. The typewriter and its support may then be lifted vertically from its position of support on the drop shelf 18 and transported to a remote location for placement on a plane supporting surface such as a table top where the service of the typist may be required.

It is to be noted from an inspection of Figs. 3 and 4 that although a corner of the composite typewriter support 33, 34 may project slightly beyond the rear edge of the drop shelf 18 when the support is in either of its extreme positions, the pendulous centering action afforded by the present mounting, when the parts are coupled and the drop shelf is in its vertical out-of-the-way position, will tend to bring the typewriter and its support to a true vertical position wherein the support is contained wholly within the confines of the drop shelf 18 so that no protruding parts of the typewriter or its support will be interfered with by any portion of the desk structure when the slide rail 22 is moved to its retracted position within the compartment 16. To the extent that friction between the pad 34 and the shelf top prevents automatic centering of the typewriter when the shelf is dropped, a slight hand pressure may be used to properly position the typewriter for movement into the pedestal.

It is also to be noted that the attachment plate 41 is wholly contained within the confines of the cut-out rectangular opening 40 provided in the resilient pad 34 and thus the pad may seat squarely and without metal contact, upon both the upper surface of the drop shelf 18, as well as upon any plane surface on which the typewriter and its support may be placed when uncoupled from the attachment post 45.

The invention is not to be limited to the exact arrangement of parts shown in the accompanying drawings or described in this specification as various changes in the details of construction may be resorted to without departing from the spirit of the invention. Only insofar as the invention has been particularly pointed out in the accompanying claims is the same to be limited.

I claim:

1. In a device for detachably mounting a typewriter or similar office machine on a desk drop shelf or similar support that is movable from a horizontal in-use position to a vertical out-of-the-way position, a base mounting for the typewriter adapted to be secured to the latter, said base mounting comprising a typewriter base plate adapted to overlie and be supported upon the drop shelf when installed thereon, an attachment plate secured to the underneath side of the base plate at a region offset rearwardly from the vertical axis passing through the center of gravity of the combined base mounting and typewriter, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal with the base mounting thereon so that, upon movement of the shelf to its vertical position, the end of the neck portion will serve as a pendulous centering suspension for the combined typewriter and base mounting and retractable means for locking said attachment post within said neck portion of the key hole slot.

2. In a device for detachably mounting a typewriter on a desk drop shelf or other similar support that is movable from a horizontal in-use position to a vertical out-of-the-way position, a base mounting for the typewriter adapted to be secured to the latter, said mounting comprising a typewriter base plate adapted to overlie and be supported upon the drop shelf when installed thereon, an attachment plate secured to the underneath side of the base mounting, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal so that, upon movement of the shelf to its vertical position, the end of the neck portion will serve as a suspension for the combined mounting and typewriter assembly, and a retractable member movably mounted on said drop shelf for projection into and withdrawal from said release opening, said retractable member cooperating with said attachment post to engage the keyhole slot in said attachment plate to prevent removal of the attachment plate from the post when the same are coupled.

3. In a device for detachably mounting a typewriter on a desk drop shelf or other similar support that is movable from a horizontal in-use position to a vertical out-of-the-way position, a base mounting for the typewriter adapted to be secured to the latter, said mounting comprising a typewriter base plate adapted to overlie and be supported upon the drop shelf when installed thereon, an attachment plate secured to the underneath side of the base mounting, there being a keyhole slot formed in said attachment plate and comprising a release opening and a neck portion, an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal so that, upon movement of the shelf to its vertical position, the end of the neck portion will serve as a suspension for the combined mounting and typewriter assembly, and a retractable member supported on and projecting through said drop shelf for projection into and withdrawal from said release opening, said retractable member cooperating with said attachment post to engage the keyhole slot in said attachment plate to prevent register of the attachment post and release opening and consequent removal of the attachment plate from the post when the parts are coupled.

4. In a device for detachably mounting a typewriter on a desk drop shelf or other similar support that is movable from a horizontal in-use position to a vertical out-of-the-way position, a base mounting for the typewriter adapted to be secured to the latter, said mounting comprising a typewriter base plate adapted to overlie and be supported upon the drop shelf when installed thereon, an attachment plate secured to the underneath side of the base mounting, there being a keyhole slot formed in said attachment plate and comprising a release opening and a neck portion, an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal so that, upon movement of the shelf to its vertical position, the end of the neck portion will serve as a suspension for the combined mounting and typewriter assembly, and a retractable member projecting through the drop shelf in alignment with the release opening of the keyhole slot and adapted to be selectively projected into and withdrawn from said opening, said member when projected into the opening having an end in close proximity to the edge of the opening remote from the confinement neck of the slot to prevent relative movement between the attachment plate and post in the axial direction of the confinement neck while permitting limited angular turning movement of the attachment plate on the stud.

5. In a device for detachably mounting a typewriter on a desk drop shelf or other similar support that is movable from a horizontal in-use position to a vertical out-of-the-way position, a base mounting for the typewriter adapted to be secured to the latter, said mounting comprising a typewriter base plate adapted to overlie and be supported upon the drop shelf when installed thereon, an attachment plate secured to the underneath side of the base mounting, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal so that, upon movement of the shelf to its vertical position, the end of the neck portion will serve as a suspension for the combined mounting and typewriter assembly, a retaining screw projecting through the drop shelf in alignment with the release opening of the keyhole slot and adapted to be selectively projected into said opening and withdrawn therefrom, said screw, when projected into the opening having a portion thereof in close proximity to an edge of the opening remote from the confinement neck of the slot to prevent relative movement between the attachment plate and post in the axial direction of the neck while permitting limited angular turning movement of the attachment plate on the stud.

6. In a device for detachably mounting a typewriter on a desk drop shelf or other similar support that is movable from a horizontal in-use position to a vertical out-of-the-way position, a base mounting for the typewriter adapted to be secured to the latter, said mounting comprising a typewriter base plate adapted to be supported on the drop shelf when installed thereon, an attachment plate secured to the underneath side of the base mounting at a region offset from the vertical axis passing through the center of gravity of the combined mounting and typewriter, there being a keyhole slot formed in said attachment plate and comprising a release opening and a neck portion, an attachment post mounted on said drop shelf having an enlarged head, whereby for reception and confinement said head is passed through the release opening and said post is fitted within the neck portion of the slot, said neck portion of the keyhole slot projecting rearwardly of the shelf when the latter is horizontal so that, upon movement of the shelf to its vertical position, the end of the neck portion will serve as a centering pendulous suspension for the combined mounting and typewriter assembly, a retaining screw projecting through the drop shelf in alignment with the release opening of the slot and adapted to be selectively projected into said opening and withdrawn therefrom, said screw, when projected into said opening, having a portion thereof in close proximity to an edge of the opening remote from the confinement neck portion of the slot to prevent relative movement between the attachment plate and post in the axial direction of the neck while permitting limited angular turning movement of the attachment plate on the stud, and a bracket mounted on the underneath side of the drop shelf through which the retaining screw extends and in which it is threadedly received.

7. In a device for detachably mounting a typewriter on a desk drop shelf or other similar support that is movable from a horizontal in-use position to a vertical out-of-the-way position, a base mounting for the typewriter adapted to be permanently secured to the latter, said mounting comprising a typewriter base plate adapted to be supported on the drop shelf when installed thereon, an attachment plate secured to the underneath side of the base mounting at a region offset from the vertical axis passing through the center of gravity of the combined mounting and typewriter, there being a keyhole slot formed in said attachment plate and comprising a release opening and a neck portion, an attachment post mounted on said drop shelf having an enlarged head, whereby for reception and confinement said head is passed through the release opening and said post is fitted within the neck portion of the slot, said neck portion of the keyhole slot projecting rearwardly of the shelf when the latter is horizontal so that, upon movement of the shelf to its vertical position, the end of the neck portion will serve as a centering pendulous suspension for the combined mounting and typewriter assembly, a retaining screw projecting through the drop shelf in alignment with the release opening of the slot and adapted to be selectively projected into said opening and withdrawn therefrom, said screw, when projected into said opening, having a portion thereof in close proximity to an edge of the opening remote from the confinement neck portion of the slot to prevent relative movement between the attachment plate and post in the axial direction of the neck while permitting limited angular turning movement of the attachment plate on the stud, a bracket mounted on the underneath side of the drop shelf through which the retaining screw extends and in which it is threadedly received, said attachment stud also projecting through the desk shelf, and means securing said stud on said bracket.

8. In a device for detachably mounting a typewriter or similar office machine on a desk drop shelf or similar support that is movable from a horizontal in-use position to a vertical out-of-the-way position, a base mounting for the typewriter adapted to be secured to the latter, said base mounting being recessed at a region offset rearwardly from the vertical axis passing through the center of gravity of the combined base mounting and typewriter, said base mounting being adapted to overlie and be supported upon the drop shelf when installed thereon, an attachment plate secured within the recessed portion of said base mounting, the lower face of the latter lying below the lower extremity of the attachment plate, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal with the base mounting thereon so that, upon movement of the shelf to its vertical position, the end of the neck portion will serve as a pendulous centering suspension for the combined typewriter and base mounting and retractable means for locking said attachment post within said neck portion of the key hole slot.

9. In a device for detachably mounting a typewriter or similar office machine on a desk drop shelf or similar support that is movable from a horizontal in-use position to a vertical out-of-the-way position, a base mounting for the typewriter adapted to be secured to the latter, said base mounting being recessed at a region offset rearwardly from the vertical axis passing through the center of gravity of the combined base mounting and typewriter, said base mounting being adapted to overlie and be supported upon the drop shelf when installed thereon, an attachment plate secured within the recessed portion of said base mounting, said base mounting being laminated and having a rigid upper lamination and a resilient bottom lamination, the lower face of the latter lying below the lower extremity of the attachment plate carried by said base mounting, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal with the base mounting thereon so that, upon movement of the shelf to its vertical position, the end of the neck portion will serve as a pendulous centering suspension for the combined typewriter and base mounting and retractable means for locking said attachment post within said neck portion of the key hole slot.

10. In a device for detachably mounting a typewriter or similar office machine on a desk drop shelf or similar support that is movable from a horizontal in-use position to a vertical out-of-the-way position, a base mounting for the typewriter adapted to be secured to the latter, said base mounting being recessed at a region offset rearwardly from the vertical axis passing through the center of gravity of the combined base mounting and typewriter, said base mounting being adapted to overlie and be supported upon the drop shelf when installed thereon, an attachment plate secured within the recessed portion of said base mounting, the lower face of the latter lying below the lower extremity of the attachment plate, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal with the base mounting thereon so that, upon movement of the shelf to its vertical position, the end of the neck portion will serve as a suspension for the combined mounting and typewriter assembly, and a retractable member movably mounted on said drop shelf for projection into and withdrawal from said release opening, said retractable member cooperating with said attachment post to engage the keyhole slot in said attachment plate to prevent removal of the attachment plate from the post when the same are coupled.

11. In a typewriter mounting for a drop shelf support that is movable from a horizontal in-use position to a vertical out-of-the-way position, a base support for the typewriter adapted to be secured thereto an attachment member secured to the underneath side of the base support, an attachment member on the drop shelf support, one of said attachment members being formed with a keyhole slot that includes a release opening and a neck portion, a cooperating attachment post on the other attachment member, and means movably mounted on one of said supports for projection into and withdrawal from said release opening, said means spaced from and cooperating with said attachment post to engage said one attachment member adjacent opposite ends of said keyhole slot to prevent relative movement between the attachment members in a direction to bring the post and release opening into register and to permit limited pivotal movement.

12. In a typewriter mounting for a drop shelf support that is movable from a horizontal in-use position to a vertical out-of-the-way position a base support for the typewriter adapted to be secured thereto, an attachment member secured to the underneath side of the base support, an attachment member on the drop shelf support, one of said attachment members being formed with a keyhole slot that includes a release opening, a cooperating attachment post on the other attachment member, said post having an enlarged head whereby for reception and confinement said head is passed through release opening and said post is fitted within the keyhole slot, and a retractable member movably mounted on one of said supports for projection into and withdrawal from said release opening, said retractable member spaced from and cooperating with said attachment post to engage said one attachment member adjacent opposite ends of said keyhole slot to prevent relative movement between the attachment members in a direction to bring the post and release opening into register and to permit limited pivotal movement.

13. In a typewriter mounting for a drop shelf support that is movable from a horizontal in-use position to a vertical out-of-the-way position, a base support for the typewriter adapted to be secured to the latter, said base support being recessed at a region offset rearwardly from the vertical axis passing through the center of gravity of the combined base support and typewriter, said base support being adapted to overlie and be supported upon the drop shelf when installed thereon, a first attachment member secured within the recessed portion of said base support the lower face of the latter lying below the lower extremity of the attachment member, a second attachment member on the drop shelf support, said first attachment member being formed with a keyhole slot that includes a release opening, a cooperating attachment post on said second attachment member, and means movably mounted on one of said supports for projection into and withdrawal from said release opening of the keyhole slot, said means spaced from and cooperating with said attachment post to engage said first attachment member adjacent opposite ends of said keyhole slot to prevent relative movement between the attachment members in a direction to bring the post and release opening into register and to permit limited pivotal movement.

14. A device for detachably mounting a typewriter on a desk drop shelf or other similar support that is movable from a horizontal in-use position to a vertical out-of-the-way position, a base support for the typewriter adapted to be secured to the latter, to overlie and be supported upon the drop shelf when installed thereon, an attachment plate secured to the underneath side of the base support, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal so that, upon movement of the shelf to its vertical position, the end of the neck portion will serve as a suspension for the combined support and typewriter assembly, and a retractable member movably mounted on said drop shelf for projection into and withdrawal from said release opening, said retractable member cooperating with said attachment post to engage the keyhole slot in said attachment plate to prevent removal of the attachment plate from the post when the same are coupled while permitting limited swivel motion between the base support and drop support, said base support being laminated and having a rigid upper lamination and a resilient bottom lamination, the lower face of the bottom lamination lying below the lower extremity of said attachment plate, said resilient bottom lamination forming a cushioned surface for supporting the base support on a table top or the like and permitting attaching screws for the mounted typewriter to be countersunk below the lower surface of the resilient bottom lamination by localized compression of said bottom lamination.

15. A device for detachably mounting a typewriter on a desk drop shelf or other similar support that is movable from a horizontal in-use position to a vertical out-of-the-way position, a base support for the typewriter adapted to be secured to the latter, to overlie and be supported upon the drop shelf when installed thereon, an attachment plate secured to the underneath side of the base support, there being a keyhole slot formed in said attachment plate and comprising a release opening and a neck portion, and an attachment post mounted on said drop shelf having a shank portion and an enlarged head, whereby for reception and confinement said head is passed through the release opening and said shank is fitted within the neck portion of the keyhole slot, said neck portion projecting rearwardly of the drop shelf when the latter is horizontal so that, upon movement of the shelf to its vertical position, the end of the neck portion will serve as a suspension for the combined support and typewriter assembly, and a retractable member movably mounted on said drop shelf for projection into and withdrawal from said release opening, said retractable member cooperating with said attachment post to engage the keyhole slot in said attachment plate to prevent removal of the attachment plate from the post when the same are coupled while permitting limited swivel motion between the base support and drop support, said base support comprising an upper base plate having substantial rigidity and a lower shock absorbing pad secured to the upper base plate, said shock absorbing pad being of soft resilient material forming a cushioned surface for supporting the base support on a table top or the like and for yieldingly resisting said swivel motion between the base support and the drop support, said resilient pad also permitting attaching screws for the mounted typewriter to be countersunk below the lower surface of the resilient lower pad by localized compression of said lower pad.

References Cited in the file of this patent

UNITED STATES PATENTS

| Number | Name | Date |
|---|---|---|
| 810,416 | Johnston | Jan. 23, 1906 |
| 1,242,441 | Hills | Oct. 9, 1917 |
| 1,625,163 | Schurr | Apr. 19, 1927 |
| 1,846,255 | Harding | Feb. 23, 1932 |
| 2,043,886 | DeBoer | June 9, 1936 |
| 2,312,985 | Bales | Mar. 2, 1943 |
| 2,539,032 | Purnell | Jan. 23, 1951 |